(12) United States Patent
Palladino

(10) Patent No.: US 7,706,938 B2
(45) Date of Patent: Apr. 27, 2010

(54) AUTOMATED SYNCHRONIZED SERVICE INTERVALS FOR VEHICLES

(75) Inventor: James Palladino, Winona Lake, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 403 days.

(21) Appl. No.: 11/742,119

(22) Filed: Apr. 30, 2007

(65) Prior Publication Data

US 2008/0269977 A1    Oct. 30, 2008

(51) Int. Cl.
    G06F 19/00    (2006.01)
    G06M 17/00    (2006.01)

(52) U.S. Cl. .............................. 701/33; 701/30; 701/99; 705/8; 340/457.4; 340/438; 73/114.55; 702/50; 702/184

(58) Field of Classification Search .................... 701/30
    See application file for complete search history.

(56) References Cited

U.S. PATENT DOCUMENTS

| | | | |
|---|---|---|---|
| 4,525,782 A * | 6/1985 | Wohlfarth et al. ............. | 701/99 |
| 4,739,482 A | 4/1988 | Wrigge | |
| 5,216,612 A * | 6/1993 | Cornett et al. ................. | 700/96 |
| 5,592,395 A | 1/1997 | Braun et al. | |
| 5,750,887 A * | 5/1998 | Schricker .................. | 73/114.55 |
| 6,219,597 B1 * | 4/2001 | Longere ....................... | 701/29 |
| 6,301,531 B1 | 10/2001 | Pierro et al. | |
| 6,370,454 B1 | 4/2002 | Moore | |
| 6,434,512 B1 | 8/2002 | Discenzo | |
| 6,459,969 B1 | 10/2002 | Bates et al. | |
| 6,480,105 B2 | 11/2002 | Edwards | |
| 6,847,872 B2 * | 1/2005 | Bodin et al. ................... | 701/33 |
| 6,876,908 B2 * | 4/2005 | Cramer et al. ................. | 701/30 |
| 6,901,318 B1 * | 5/2005 | Morronigiello et al. ....... | 701/29 |
| 7,286,916 B2 * | 10/2007 | Hoeflacher et al. ............ | 701/29 |
| 2002/0069001 A1 * | 6/2002 | Sinex .......................... | 701/29 |
| 2006/0136105 A1 * | 6/2006 | Larson ........................ | 701/30 |

OTHER PUBLICATIONS

Bohlin, M. et al "Reducing Vehicle Maintenance Using Cndition Monitoring and Dynamic Planning", RAilway Condition Monitoring, 2008 4th IET Conference on Jun. 18-20, 2008, pp. 1-6.*

* cited by examiner

*Primary Examiner*—Thomas G Black
*Assistant Examiner*—Lin B Olsen
(74) *Attorney, Agent, or Firm*—Jeffrey P. Calfa; Mark C. Bach

(57) ABSTRACT

User generated service rules operate upon selected vehicle operating variables, vehicle configurations and vehicle vocations to produce estimates of the service life of diverse, routine service items. Items with corresponding projected service lives are grouped for service to reduce overall service frequency.

6 Claims, 11 Drawing Sheets

FIG. 7

| Usage Item | Description | Int Rate | % Used | Service Flag | Usage Burden |
|---|---|---|---|---|---|
| 1 | Engine Oil And Filter - Replace | 0 | 0 | 0 | 105 |
| 2 | Fan Clutch - Check | 0 | 0 | 0 | 1 |
| 3 | Fan Belt - Inspect | 0 | 0 | 0 | 1 |
| 4 | Fuel Filters - Drain | 0 | 0 | 0 | 1 |
| 5 | Fuel Filter - Replace | 0 | 0 | 0 | 10 |
| 6 | Air Filter - Check | 0 | 0 | 0 | 1 |
| 7 | Coolant - Check Level | 0 | 0 | 0 | 2 |
| 8 | Coolant - chk concentration | 0 | 0 | 0 | 45 |
| 9 | Coolant - Add Extender | 0 | 0 | 0 | 15 |
| 10 | Wheel Bearings - Repack | 0 | 0 | 0 | 94 |
| 11 | Chassis - Lubricate | 0 | 0 | 0 | 19 |
| 12 | Alternator/Starter/Battery - Check | 0 | 0 | 0 | 24 |
| 13 | Gauge/Warning Lights - Check | 0 | 0 | 0 | 2 |
| 14 | Power Steering Fluid - Change | 0 | 0 | 0 | 34 |

Simulation Time (Days): 1.400257

| Item # | Description | Calc Rate | %Used | 1st Service Interval | 2nd Service Interval | 3rd Service Interval | 4th Service Interval |
|---|---|---|---|---|---|---|---|
| 1 | Engine Oil And Filter - Replace | 2.05 | 3 | X | X | X | X |
| 2 | Fan Clutch - Check | 2.27 | 4 | X | X | X | X |
| 3 | Fan Belt - Inspect | 2.27 | 4 | X | X | X | X |
| 4 | Fuel Filters - Drain | 2.27 | 4 | X | X | X | X |
| 5 | Fuel Filter - Replace | 1.13 | 2 |  | X |  | X |
| 6 | Air Filter - Check | 2.27 | 4 | X | X | X | X |
| 7 | Coolant - Check Level | 2.27 | 4 | X | X | X | X |
| 8 | Coolant - chk concentration | 2.27 | 4 |  | X | X | X |
| 9 | Coolant - Add Extender | 0.22 | 0 |  |  |  |  |
| 10 | Wheel Bearings - Repack | 2.27 | 4 | X | X | X | X |
| 11 | Chassis - Lubricate | 2.27 | 4 | X | X | X | X |
| 12 | Alternator/Starter/Battery - Check | 1.13 | 2 |  |  | X | X |
| 13 | Gauge/Warning Lights - Check | 2.27 | 4 | X | X |  | X |
| 14 | Power Steering Fluid - Change | 0.22 | 0 |  |  |  |  |
| 15 | Master Brake Cylinder - Check | 2.27 | 4 | X | X | X | X |
| 16 | Brake Pads/Shoes - Check | 2.27 | 4 | X | X | X | X |
| 17 | Trans Fluid - Check Level | 2.27 | 4 | X | X | X | X |
| 18 | Rear Axle Oil - Change | 2.27 | 4 | X | X | X | X |

| | 1st Service | 2nd Service | 3rd Service | 4th Service |
|---|---|---|---|---|
| | 45 | 91 | 137 | 183 |

| | 1st Burden | 2nd Burden | 3rd Burden | 4th Burden |
|---|---|---|---|---|
| | 570 | 604 | 570 | 604 |

Average Burden: 362

Simulation Time(Days): 1.400257

| Item # | Composit # | Description | Value |
|---|---|---|---|
| 1 | 101 | Engine Oil-Armored Car | 1 |
| 2 | 102 | Engine Oil- Beverage | 0.5 |
| 3 | 103 | Engine Oil- Delivery | 1 |
| 4 | 104 | Engine Oil-Emergency | 0.9 |
| 5 | 105 | Engine Oil- Leasing | 1 |
| 6 | 106 | Engine Oil- Military | 0.85 |
| 7 | 107 | Engine Oil- Platform | 1 |
| 8 | 108 | Engine Oil- Recovery | 0.95 |
| 9 | 109 | Engine Oil- Tank | 1 |
| 10 | 110 | Engine Oil- Utility | 1.1 |
| 11 | 111 | Engine Oil-Waste Collection | 0.95 |
| 12 | 0 | | 0 |
| 13 | 0 | | 0 |
| 14 | 0 | | 0 |
| 15 | 0 | | 0 |
| 16 | 0 | | 0 |

FIG. 11

AUTOMATED SYNCHRONIZED SERVICE INTERVALS FOR VEHICLES

BACKGROUND OF THE INVENTION

1. Technical Field

The invention relates to synchronized scheduling of routine service items for motor vehicles and more particularly to synchronizing such service to optimize the incurred cost of maintenance to the vehicle operator.

2. Description of the Problem

Truck fleet operation is highly competitive and fleet operators are highly conscious of the need to minimize overall preventive maintenance costs, repair costs, fleet operational availability and vehicle replacement costs. While cost effective fleet management and readiness requirements demand the practice of preventive maintenance, rigid adherence to independent service schedules for each of long list of vehicle systems requiring recurring service can be inefficient. For example, changing engine oil is both a cost and removes a vehicle from service for a period of time, an additional indirect expense. Increased vehicle down time due to the perceived need to perform all recurring maintenance items in accord with strict schedules removes vehicles from service more often than may be necessary, complicates scheduling, and may compel an operator to have more tractors in a fleet than he would otherwise.

Routine maintenance on vehicles has been manually scheduled according to the recommended service intervals of the manufacturers of each fluid or component of interest. Vehicle parameters, such as distance traveled and engine operating hours, have often been manually recorded in order to determine when routine maintenance should be scheduled. If synchronization of services is desired, the service scheduler also must do this manually, or record the information into a computer programmed to determine scheduling. This requires time and effort in tracking vehicle usage parameters and invites error.

Individuals responsible for scheduling and performing maintenance of vehicles have had to keep track of such parameters as distance traveled, engine operating hours, fuel consumed, the time elapsed since last service, etc., to properly determine service intervals. If scheduling optimization by synchronizing certain intervals is desired, this must also be calculated and accomplished manually based on the information available and historical trends (if such trends are recorded and tracked). This process includes entering all relevant vehicle data into a software package to assist in maintenance tracking and scheduling, creating some type of custom software or spreadsheet that accomplished this goal, or using the well-established 'pencil & paper' method.

Many contemporary vehicles are equipped with body computers, local controllers and controller area networks to implement many aspects of vehicle control as well as position determining systems and telematic linkages to central data base management systems. In vehicles designed, built and sold by International Truck and Engine Corporation, an Electrical System Controller ("ESC") carries out the functions of the body computer. Local controllers which communicate with each other and with the ESC to distribute data and requests essential for operation of local programming by which control is implemented. Further integration of these vehicle facilities with service scheduling would be desirable.

SUMMARY OF THE INVENTION

According to the invention the vehicle controller area network employs vehicle onboard sensors to monitor vehicle operating variables, and projects the service life of items requiring routine service based on vehicle operating variables selected by the user. Items are grouped for service to minimize the overall number of servicing instances. The variable selection process completes rules for service life projection. The rules form a usage rate algorithm which is one major element of the inventive system. The rules accommodate different vehicle vocations and configurations. The outputs of the usage rate algorithm are supplied to a service scheduling algorithm which govern when servicing of a vehicle is to take place and which items are to be serviced during servicing. User initiated rule generation allows user/operators to project service for items in terms of the operator's experience with his/her vehicles. For example, depending upon the character of use to which the vehicles are put an operator may find that total fuel consumption since the last engine oil change and filter replacement is a better indicator of the need to change engine oil than distance traveled. The invention treats items which require maintenance (e.g. engine oil service life) as commodities that are consumed. It calculates the rate at which these commodities are depleted to predict the future maintenance requirements of the vehicle.

A second major element of the invention is the scheduling algorithm. Through the scheduling algorithm the operator can specify allowed ranges for service to take place for an item. The scheduling algorithm operates to pull-in and push-out items for service to reduce the overall frequency of servicing. This is not to say that any item is serviced less frequently, but rather that service points are chosen which allow as many as items as feasible, which are near the end of their service lives, to be serviced at one time. This is termed service synchronization.

The servicing algorithm can also operate in two different modes including a real time mode, which provides normal day to day scheduling, and a simulation mode, which uses historical data to simulate long periods of truck usage (e.g. one year), in a short period of time (e.g. 10 minutes). Simulation modes allow the user to see the effects of different scenarios on maintenance schedules and cost and potentially to relate those scenarios to vehicle scheduling and service center operations, depending upon the size of operation and can be used to provide an input to fleet scheduling to optimize fleet operational availability.

The invention is implemented through software which runs on a computer installed on the vehicle or which is communicated with over a telematics-portal. If the program is hosted in the vehicle, it is programmed using a series of graphic displays. The results of the program appear on a service tool, an optional vehicle display, or transmitted through telematics. If the software is hosted on the telematics-portal, it obtains data through the portal and also display results through the portal.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a screen shot of a rules generation screen used with the invention.

FIG. 8 is a screen shot of a usage screen used with the invention.

FIG. 9 is a screen shot of a vocation screen used with the invention.

FIG. 10 is a screen shot of a result screen generated by the invention.

FIG. 11 is a screen shot of a usage/vocation composite screen used with the invention.

DETAILED DESCRIPTION OF THE INVENTION

Figure 1:
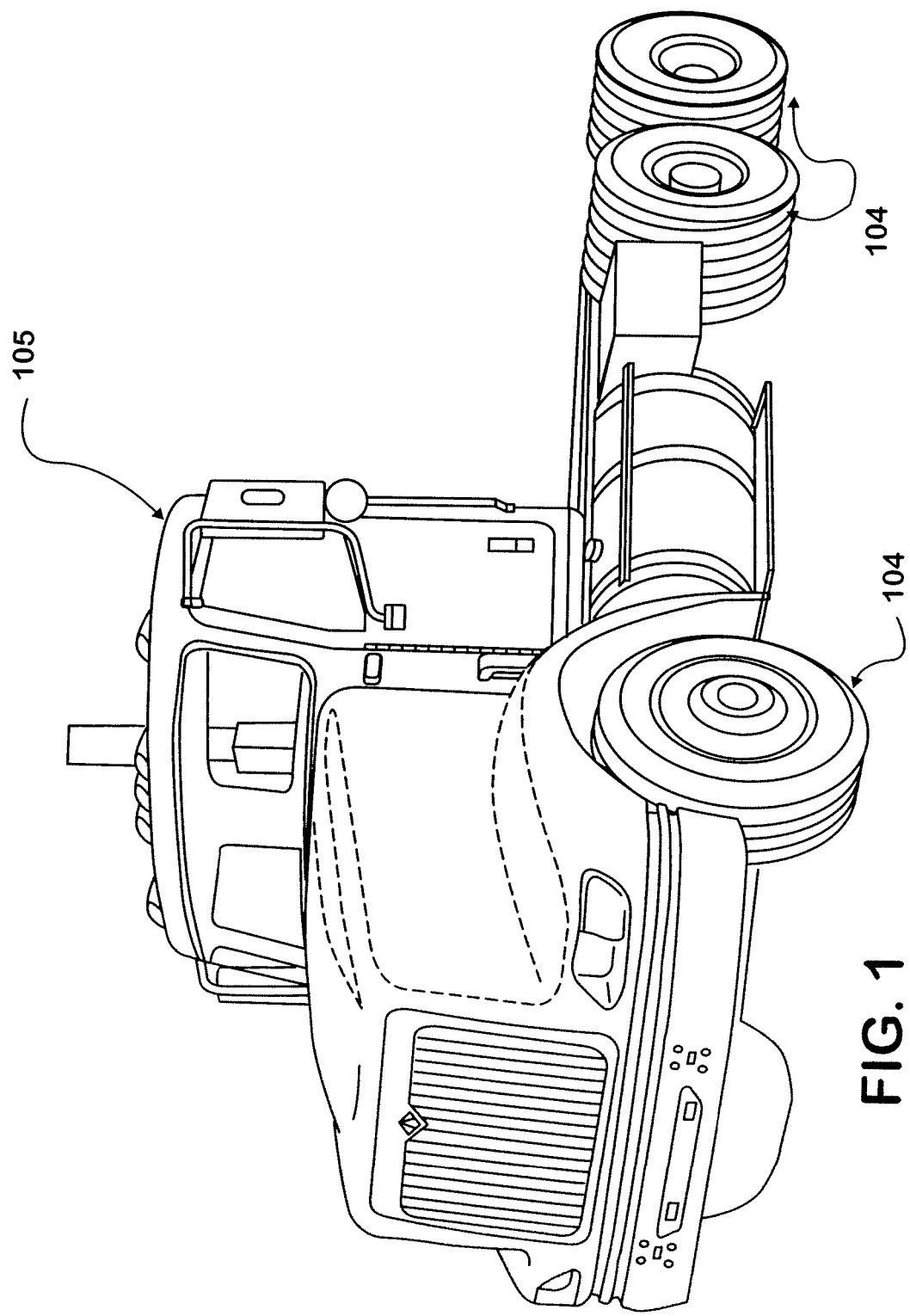
FIG. 1 is a perspective view of a tractor with which the invention is advantageously used.

Referring now to FIG. 1 a tractor 105 with which the present invention is advantageously employed is shown. Tractor 105 is conventionally equipped with a diesel engine, with which various fuel and oil filters are employed requiring periodic service. Tractor 105 also requires the periodic replenishment or replacement of various service fluids, such as engine oil. Tractor 105 has an exhaust system which may incorporate pollution control equipment such a diesel particulate filter, which may require periodic service and a cabin climate control system, which also may require periodic service depending upon use. The vehicle will include batteries the service life of which may depend upon temperature cycling and the number of times the engine is cranked on starting. These items have service life cycles, which may be predicted using vehicle operating variables. The service life of the items thus can be expressed in terms of a quantity to be consumed, which in turn can be projected to a mileage and date when service of the item is anticipated to be required. This in turn allows a date for service to be projected depending upon past average use of the tractor 105.

Figure 2:
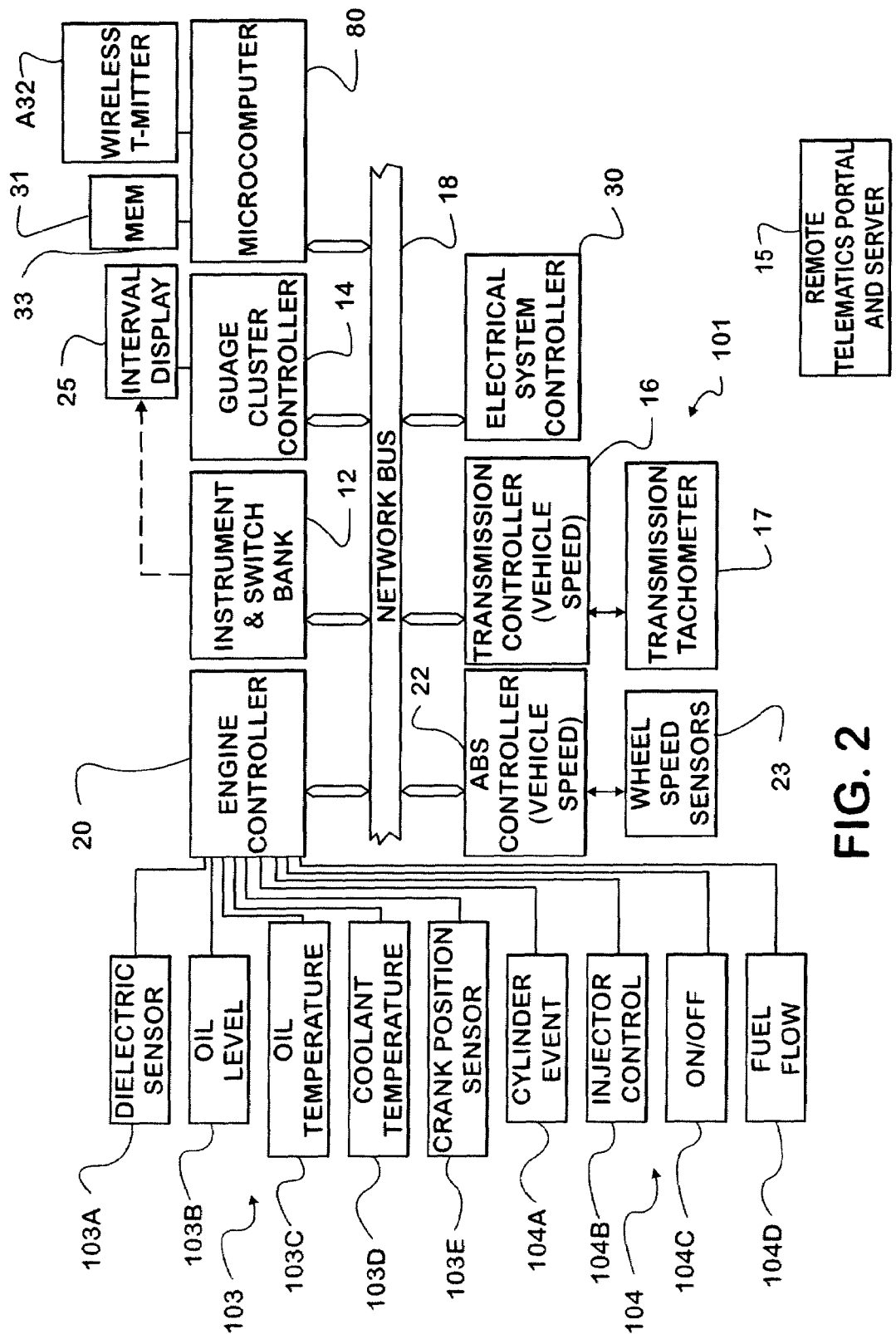
FIG. 2 is a vehicle controller area network schematic used to execute the algorithm of a preferred embodiment of the invention.

The sources of data required for the projections required to implement the invention can be diverse, including, for example, information about scheduled use of the vehicle, values assumed by the variable(s) determining consumption of the service item, distance traveled and elapsed real time. It is anticipated that different users, based on different operating conditions encountered by their vehicles, will use different data to project service life. The sources of data will be sensors installed on tractor 105 to monitor vehicle operating conditions. FIG. 2 illustrates a vehicle controller area network (CAN) 101 which interconnects the local and remote sources of data relating to implementation of a synchronized service scheduling algorithm. Vocational controllers monitor sensors which collect data to generate data used by the algorithm and share the data over CAN 101. Among the vocational controllers are an engine controller module 20, instrument and switch bank 12, gauge cluster 14, anti-lock brake system controller 22, transmission controller 16, on board microcomputer 80 and ESC 30 all communicate over network bus 18. The particular configuration shown is to be taken as an example only and not limiting as to the scope of the invention. ESC 30 or microcomputer 80 are presumed to maintain a real time clock. Where the algorithm of the invention is executed remotely a wireless link 82 exists between CAN 101 and remote telematics portal and server 15 accessed by wireless link, such as a cellular phone connection to the an internet portal. If the program is executed locally memory 31 provides a store for the program accessible by microcomputer 80. The items illustrated as monitored here are provided as examples only, the invention being concerned with service scheduling, not an itemized listing of specific rules for given service items. In fact rule specification is flexible. Oil changes may be calculated in terms of total fuel flow, or a more complex rule taking into account engine torque loading and fuel flow, or a simple rule based on distance traveled. The choice of rule can depend upon a particular operator's experience, and the choice of the best rule may be specific to a particular operator.

Engine controller (ECM) 20 is the local controller which collects most of the required data to implement the rule aspect of invention although the source of the data can be any controller. However, ECM 20 is connected to group 103 of engine sensors 103A-E, which include an oil dielectric sensor 103A, an oil level sensor 103B, an oil temperature sensor 103C, a coolant temperature sensor 103D and a crank position sensor 103E. The rate of change (derivative with respect to time) of the output of the crank position sensor 103E serves as a tachometer, which can be used in conjunction with fuel flow to estimate the load on the engine. ECM 20 also receives data from a fuel flow sensor 104D, provides information as to whether the engine is running or not (ON/OFF sensor 104C) and from cylinder event counter 104A and injector control 104B can track how many ignition events have occurred in each cylinder. The sensors illustrated are not meant to be exhaustive, but are simply examples of the types of sensors providing data which might be of interest to a rule designer.

Control actuator group 104 includes controllers and counters for events under the control of ECM 20. An ON/OFF controller 104C indicates whether the engine 19 is running. ECM 20 will provide control signals to injector control 104B. Timing information for the injector control signals requires piston position information, which is typically derived from crankshaft position. This information comes from a crankshaft position sensor 17. ECM 20 also has control over fuel flow 104D.

ABS controller 22 tracks wheel speed sensors and controls the timing and pressure of brake application. ABS controller 22 thus can be used to provide estimates of brake lining wear and vehicle speed. Alternatively, the transmission controller 16, which has an input from a transmission tachometer may be used to provide vehicle speed, the time integral of which is distance traveled.

Where the program is hosted on tractor 105, a display 25 provides display of service intervals and the screens displayed to an operator used to implement the invention under the control of either a gauge cluster controller 14 or an instrument and switch bank 12.

Figure 3:
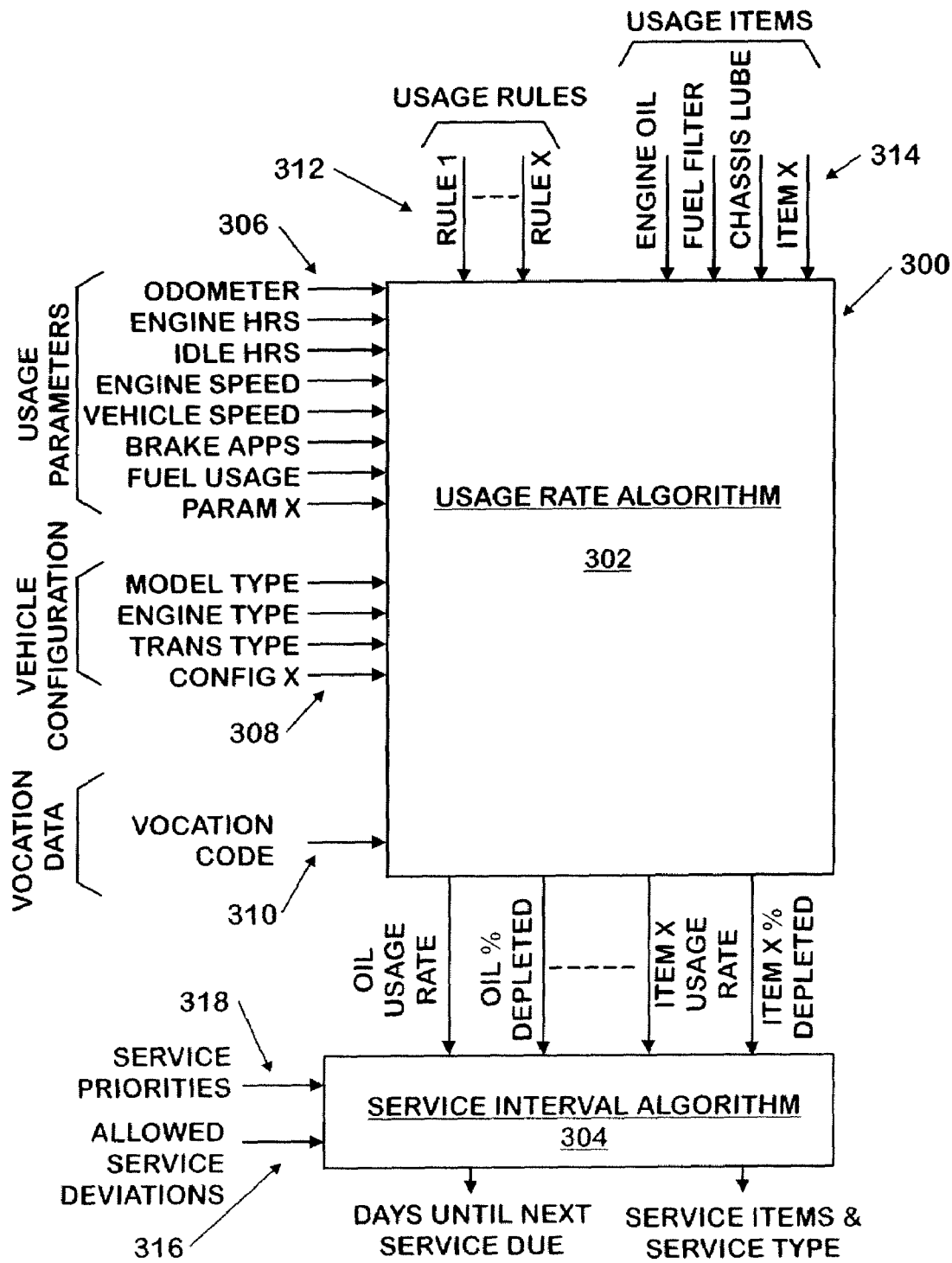
FIG. 3 is a data flow diagram.

Understanding of the invention may be facilitated by reference to FIG. 3 which is a data flow diagram of the combined program 300 for execution of the rules (usage rate algorithm 302) and determination of the service intervals (service interval algorithm 304).

The tracking of real time operating parameters is accomplished by either hosting the program 300 on a computer 80 in the vehicle or using real time data transmitted through telematics. Examples of usage parameters/operating variables include elapsed time, miles, engine hours, idle hours, engine rotations, brake time and fuel used. Other parameters may also be incorporated as needed and may include any data which is transmitted on the vehicle's data bus or can be obtained through a sensor. In addition, the usage rate algorithm makes use of vehicle configuration information 308 and vehicle vocation data 310. The usage rate parameters (or variables) 306, vehicle configuration 308 and vocation data 310 provide inputs to the rules 312 specified by the operator. The usage rules 312 are executed to generate results corresponding to consumption of usage items 314, such as engine oil, fuel filter, etc. The algorithm can utilize any measured operating variable that is available on a truck, and allows the user to tie maintenance items to those parameters in an intelligent way. For example, the user can schedule brake maintenance based on the amount of time that the brakes peddle is depressed and the pressure applied. This allows the vehicle to be maintained more closely to how it is actually used which could lower cost and optimize vehicle performance.

Consumption rates and percentage depletion figures are supplied from the usage rate algorithm 302 to the service interval algorithm 304. Usage rules are user modifiable codes which define how a serviceable item relates to the vehicle's operating parameters. These rules center around a few key concepts. The first is that each serviceable item is a commodity that is consumed. This is easy to see with an item such as an air filter which is fully consumed when it is clogged. But the concept can be applied to any item, even a fluid level check, which is fully consumed after a certain amount of vehicle usage.

With each item viewed as a consumable commodity, a rate of consumption and a consumption status is calculated. The rate of consumption is the amount of each item which is consumed per day based on the usage rule. For example, if the user generates a rule which specifies that engine oil must be changed after 10000 gal of fuel is consumed, and the vehicle uses an average of 100 gal per day, the consumption rate for engine oil is 1% per day. Engine oil status after 20 days is 20% consumed. The output of this portion of the program is fed into another algorithm called the "Service Interval Algorithm" 304. This portion takes the current status and usage rate, then calculates service target dates for each item. The first target date is the number of days from today when a particular service item is 100% consumed. The second target date is the number of days from today when that item will need service again. This process is repeated until four service dates are generated.

The service interval algorithm 304 implements synchronization of items for service at discrete intervals, pulling some items "in" and pushing other items "out" based on allowed service deviations 316 (the preferred service windows or bands) and service priorities 318. Synchronized service is used to optimize the routine maintenance of trucks. The service interval algorithm 304 generates optimized maintenance schedules, based on service priorities, for multiple future dates. It also specifies which items require service on those future dates. FIG. 10 is a screen display illustrating an example of the algorithm's output for a plurality of service items for a particular vehicle. Future service dates of 45, 91, 137, and 183 days away are forecast. Items with overlapping bands are serviced together.

Pull-in and push-out are key concepts that the service algorithm 304 uses. Service windows are specified by the user during generation of the Usage Rules. They signify an acceptable range around the target date for complete consumption of an item in which the item may be serviced. These ranges are used by the "Service Interval Algorithm" 304 to group serviceable items together and therefore perform maintenance using the least number of service intervals.

FIG. 3 shows that the rate of depletion and current percent of depletion is calculated by the "Usage Rate Algorithm" 302. This data becomes the input of the "Service Interval Algorithm" 304 which calculates the service intervals and which items should be serviced at a particular interval.

Inputs to the algorithms are shown with arrows. These inputs come from the user interface, the vehicle data bus, or vehicle sensors. Algorithm outputs provide four types of information, days until next service, service items, the depletion rate for each service item, and the percent depleted for each service item.

Figure 4:
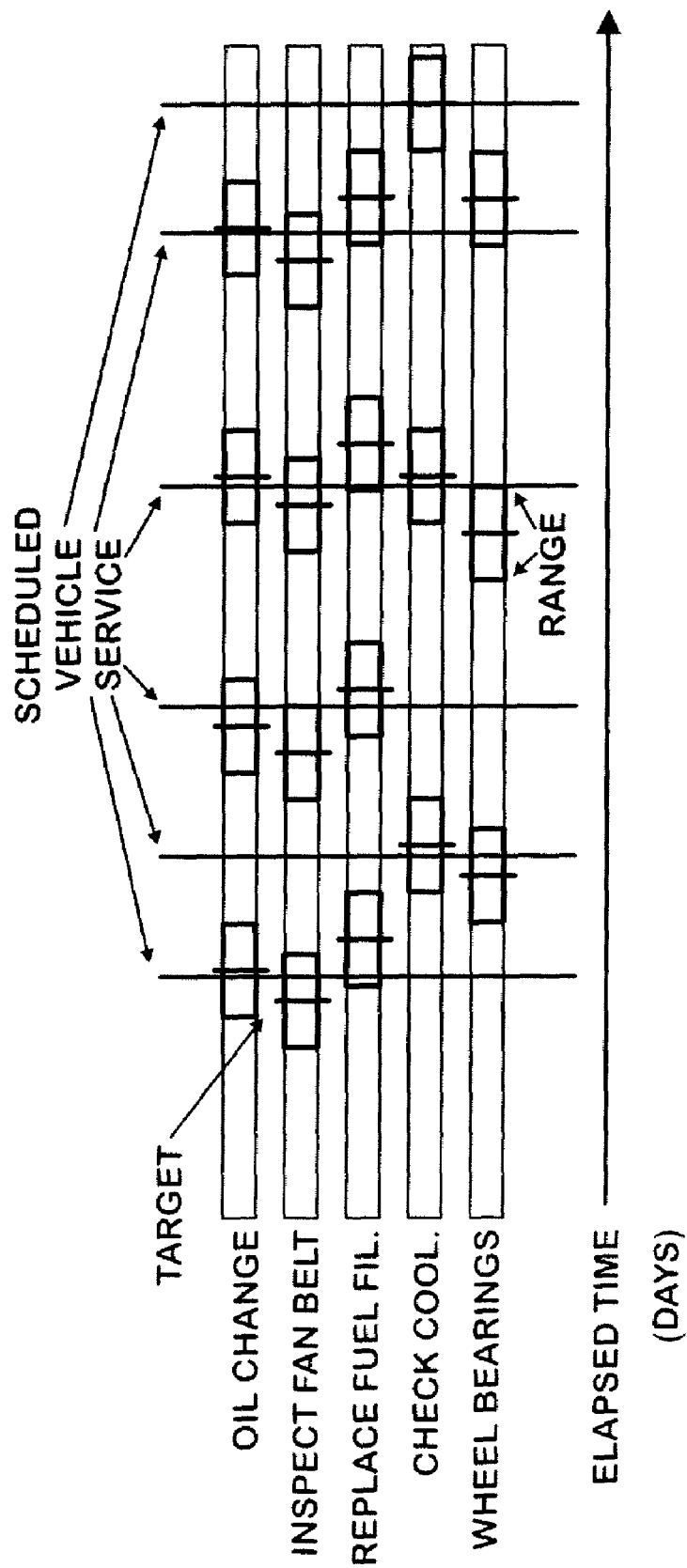
FIG. 4 is a chart illustrating recommended service intervals without considering synchronization.
Figure 5:
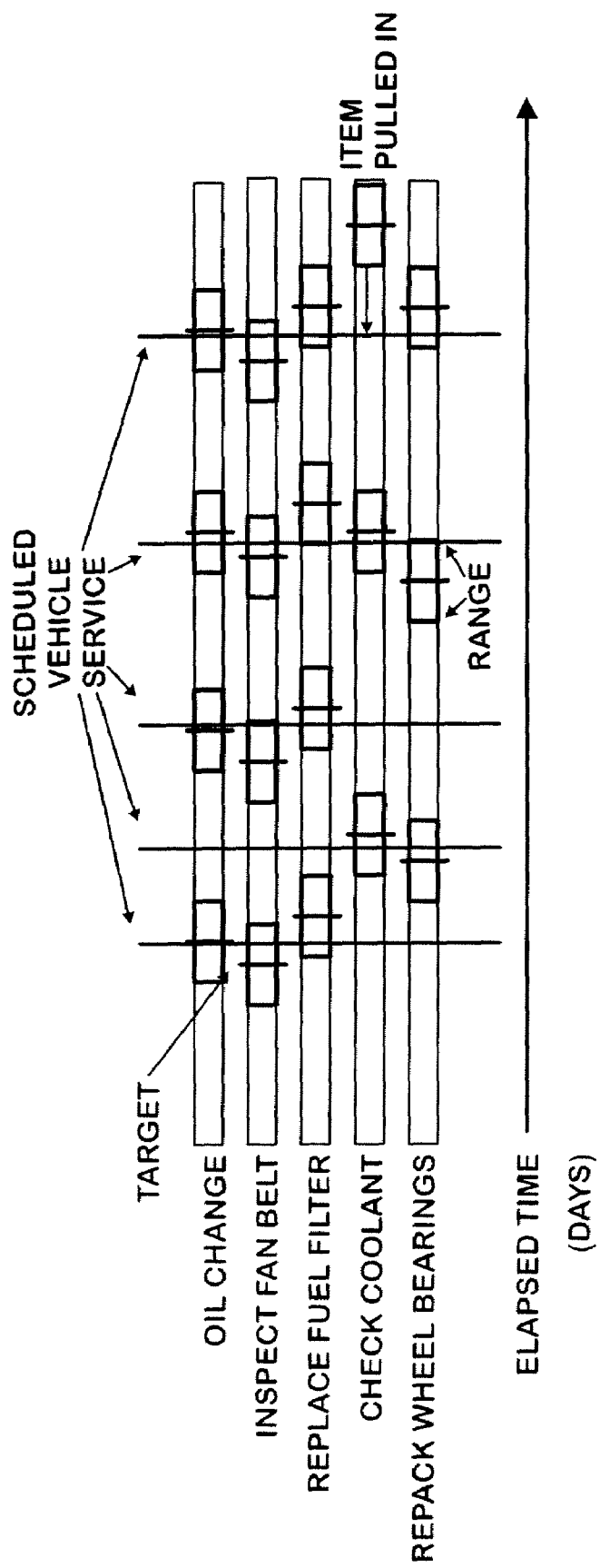
FIG. 5 is a chart illustrating synchronization of service as achieved using a preferred embodiment of the present invention.

FIGS. 4 and 5 graphically show how target dates and ranges interact to form the vehicle service schedule both as done in the prior art and as part of the invention. The chart of FIG. 4 shows service intervals without considering synchronization while FIG. 5 shows that the first scheduled maintenance would include service engine oil, the fan belt, and fuel filter with synchronization, since these three items have ranges that overlap. Note that these ranges are specified by the user as "pull-in" and "push-out" values. The larger the ranges, the more items will be serviced together. Items can even be pulled-in in advance of a window. This would typically be done for any low cost service item requiring little or no time.

FIG. 4 illustrates how a number of service intervals could be scheduled, with the last service date containing only one item, where pull-in and push-out are not used. This would probably be undesirable. To handle this, the usage rules include the ability to group service items together. When items are grouped, it forces those items to be serviced together.

FIG. 5 repeats the previous example except the user grouped "Check Coolant" and "Repack Wheel Bearings". This causes "Check Coolant" to be pulled into the fifth service interval and eliminates the sixth service.

Figure 6:
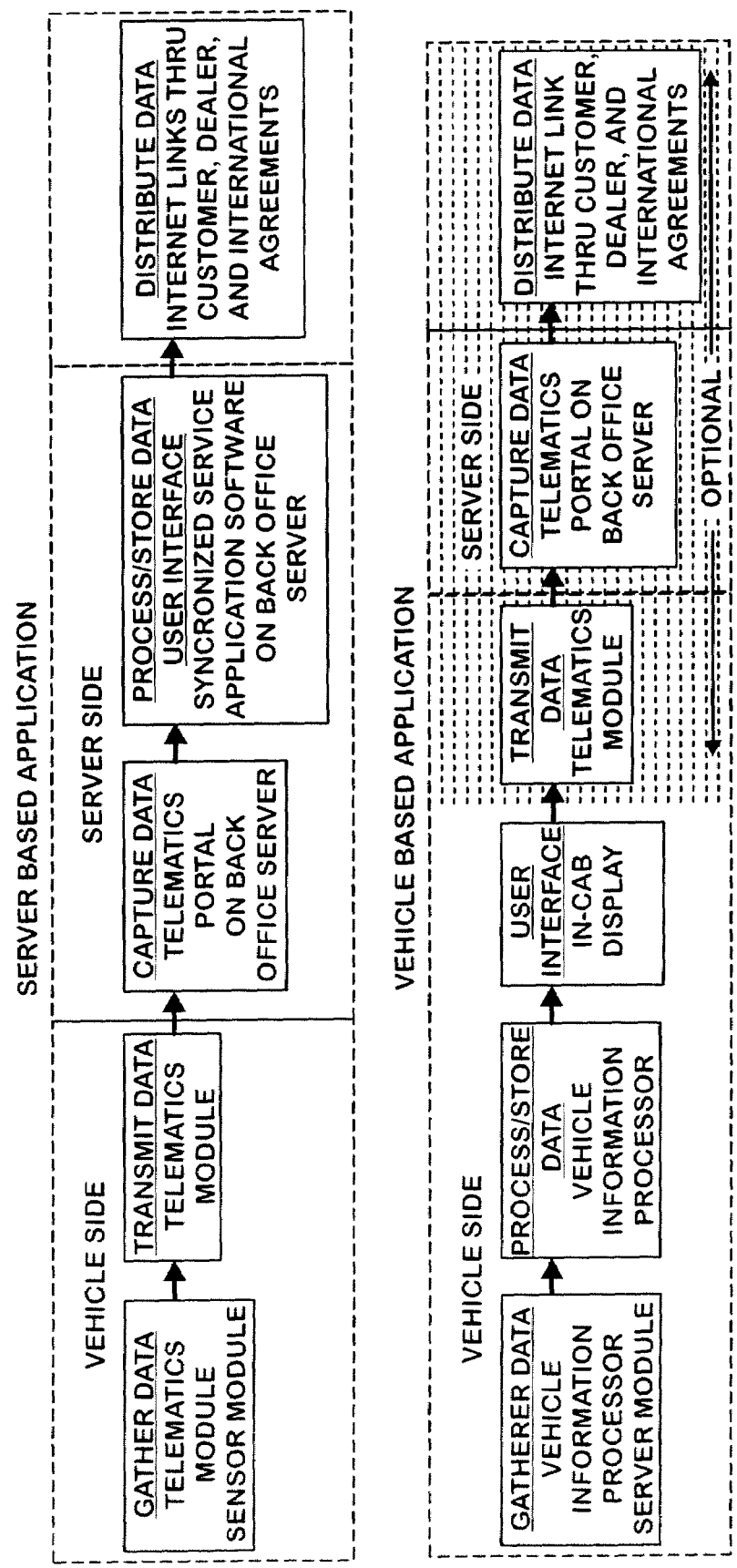
FIG. 6 is a process flow diagram illustrating operation of the invention.

The ideal target dates shown in FIG. 6 were determined by relating one or more vehicle parameters to the depletion rate of a service item. Other factors which cannot be measured through vehicle parameters may also affect depletion rates. If the vehicle normally operates in a dusty environment for example, the air filter will clog more quickly. The configuration of a vehicle also effects which items require service and how fast depletion occurs. Different engines for example, have different oil depletion rates. The algorithm handles this through two similar but distinct mechanisms. These mechanisms are called the "Usage Vocation Composite" (UVC) and the "Usage Configuration Composite" (FIG. 11).

FIG. 11 is a cross reference of serviceable items and vehicle vocations for the UVC. The user enters a number with each combination which will increase or decrease the depletion rate. The figure is an example of how entries in the list are formulated for selection by the user. The UCC is constructed in a similar manner except that the vocation is replaced by vehicle configurations.

The synchronized service algorithm 304 is designed run using live vehicle parameters or a historical record of parameters. When running with live parameters it processes data in real time and updates it's output periodically as time progresses. The maintenance schedule would typically be updated once each day.

When using historical records, the algorithm can run much faster than real time. For instance one year of vehicle data can be processed in a few minutes. This is simulation mode. The advantage of simulation mode is that the user can change the rules governing service and quickly see it's effect on the historical data. If the historical data is typical of the vehicle's actual usage, it becomes a good indication of future maintenance requirements.

FIG. 6 illustrates algorithms for synchronized service designed so they can run on a processor embedded in a vehicle or an office computer (server). In the server based application, telematics is used to gather vehicle parameters and transmit them to the server for the algorithm to process and display to the user. In the vehicle based application, the processing is done on the vehicle, with the results optionally transmitted back to the server. The results could also be displayed in the truck using an optional display.

Figure 7:
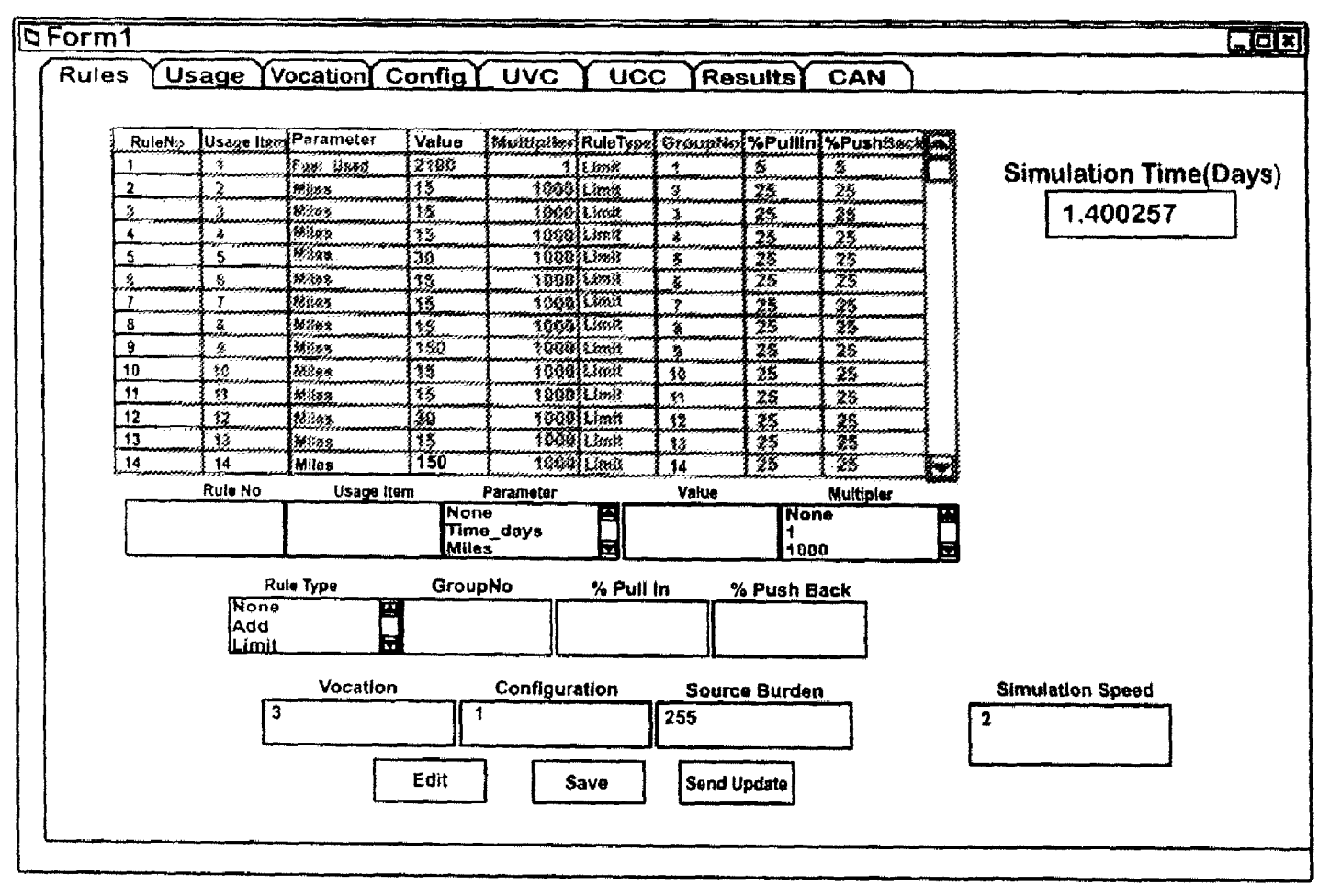

The "Rules" screen of FIG. 7 is used to formulate usage rules. A rule specifies how a service item relates to vehicle parameters. Rules are numbered in ascending order. Multiple rules may be written for any service item (also called a usage item). Each rule consist of 9 elements. These are:

Rule Number—Assigns a number to each rule in ascending order;

Usage Item—The service item (i.e. oil change) that this rule defines. Note that service item numbers are cross referenced to actual service procedures in the "Usage" screen;

Parameter—The vehicle parameter associated with this rule. Possible parameters include, "Time_Days", "Miles", "Engine_Hours", "Idle_Hours", "Engine_Rotations", "BrakeTime", and "Fuel_Used";

Value—This element combined with the multiplier establishes the point where the "rule" is considered 100% used. Note that this may not mean that the Usage Item is 100% used since rules can be combined in different way as specified by the Rule Type;

Rule Type—This entity establishes the relationship of the parameter to the usage item. There are three possibilities, "Add", "Limit", and "Average". If "Add" is specified, the percent used established by this rule is added to the percent specified by another rule that has the same usage item and specifies "Add" as the rule type. If "Limit" is specified, the item is depleted when the value specified matches the actual amount used. If more that one rule (for the same usage item) specifies "Limit" the rule in which depletion is greatest dominates. If "Average" is specified, the percent used of all such rules (with the same usage item) are averaged together.

Group No.—This entity allows the user to insure that certain items will be serviced together. This is accomplished by assigning a group number to each rule. Rules that specify the same group number are always serviced together.

Pull-in/Push-out—These entities allow the user to provide the algorithm with a range in which service for that item can take place. For example, if the user enters 5 for both Pull-in and Push-out, that item can be serviced 5% early or 5% late. These ranges are used by the program to group as many service items together as possible.

The "Usage" Screen of FIG. 8 allows the user to enter information about items that require service. The following are fields related to this screen:

Usage Item—Assigns a number to each item requiring service in ascending order.

Description—Allows the user to enter a description of the item requiring service.

Init Rate—Allows the user to enter a rate of depletion for this item. The number represents a percent and is used by the algorithm as a starting point.

% Used—Allows the user to enter the current depletion number. This number is interpreted as a percent.

Service Flag—When service is performed on a item, the user can enter a 1 in this field to convey that information to the algorithm. After the program resets the item, the user should re-enter a 0 in this field.

Usage Burden—This field allows the user to enter information related to the cost of servicing the item.

Figure 9:
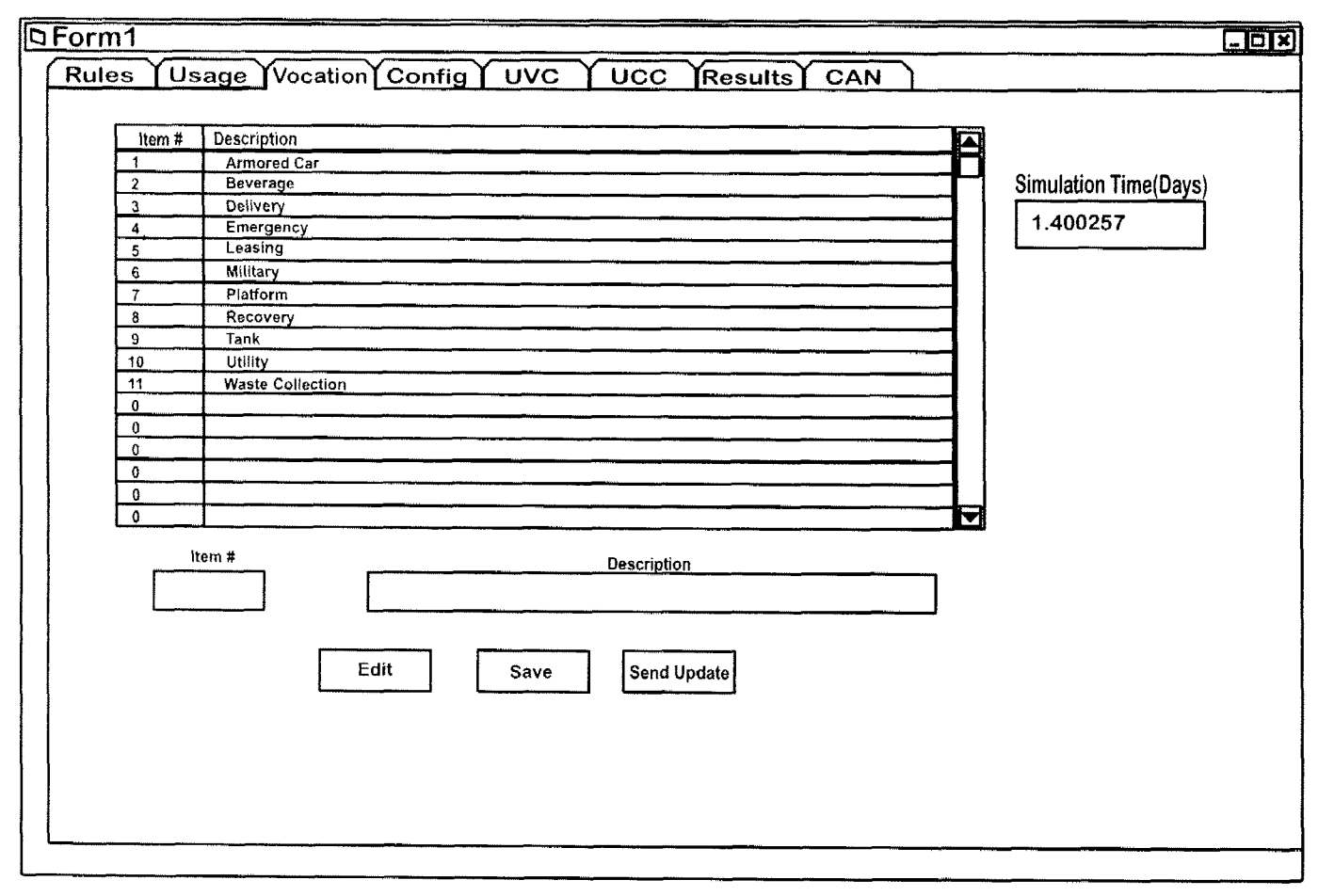

The "Vocation" screen of FIG. 9 allows the user to enter a list of vocations that a vehicle could be used for.

Accessing the "Config" tab shown in FIGS. 7-11 allows the user to enter possible configurations of the vehicle.

The "UVC" (Usage Vocation Composite) of FIG. 11 allows the user to relate the vocation of a vehicle to items being serviced. The value entered is a multiplier which effects the service item being specified. Using item number 2 in the figure as an example, the value for any rule involving engine oil change on a beverage truck will be multiplied by 0.5.

Under the "UCC" (Usage Configuration Composite) tab a screen similar to the "UVC" screen is available except that the configuration of the vehicle is used to determine the multiplication factor.

The "Results" screen shown in FIG. 10 displays the results of the algorithm back to the user. This screen lists all the items that could possibility be serviced. There are four columns to the right of this list. These columns represent the next four service dates. The box at the bottom of a column shows the projected number of days until that service is expected to occur. The "X" in the columns shows which items should be serviced on each date. The "Burden" is the expected cost for that service interval. The "Average Burden" is monthly cost.

The algorithm is flexible in allowed definitions for rules. It allows the user to develop the "Rules" which define how the operating vehicles of a vehicle are used to generate a maintenance schedule. The program automatically monitors these parameters in real time (i.e. fuel used or the amount or time the brake is applied), and predicts future service intervals. The program also allows the user vary maintenance scheduling based on the vehicle's vocation and configuration. The program's simulation mode allows the user to test the effect of different combinations of vehicle usage and service rules.

While the invention is shown in only one of its forms, it is not thus limited but is susceptible to various changes and modifications without departing from the spirit and scope of the invention.

What is claimed is:

1. A vehicle service scheduling system comprising:
a plurality of vehicle onboard sensors for monitoring vehicle operation and generating data related thereto;
a data processing system programmed to execute an algorithm for vehicle service scheduling;
a vehicle controller area network coupled to the plurality of vehicle onboard sensors to collect the data and to provide the data to the data processing system as inputs to the algorithm for vehicle service scheduling;
means associated with the data processing system for allowing operator characterization of usage rules for a plurality of serviceable items installed on a vehicle, the usage rules defined by reference to operator selected data generated by the vehicle onboard sensors and establishment of a plurality of service life ranges for the plurality of serviceable items in terms of the operator selected data;
the algorithm for vehicle service scheduling including a first sub-algorithm for calculating usage rate of the plurality of serviceable items using the usage rules and a second sub-algorithm for scheduling service and selecting the plurality of serviceable items for service, the first sub-algorithm including the operator characterized rules and the second sub-algorithm operating on the results of the first sub-algorithm;

the algorithm vehicle service scheduling operating for grouping of the plurality of serviceable items for service to minimize the overall number of service intervals; and display screens under the control of the data processing machine for displaying the usage rules accommodating different vehicle vocations and configurations under selection by the operator.

2. The system as set forth in claim 1, wherein the second sub-algorithm operating to pull-in and push-out items for service to reduce the overall frequency of servicing.

3. The system as set forth in claim 2, further comprising:

the second sub-algorithm being operable in first and second modes including a real time mode, which provides day to day scheduling, and a simulation mode, which uses historical data to simulate long periods of vehicle operation to evaluate different usage rules for particular items.

4. The system as set forth in claim 3, further comprising:

means for projecting at least four future service intervals.

5. A method of setting service intervals for a vehicle, the method comprising the steps of:

identifying items on the vehicle for recurring service and an estimated life for each item;

generating usage rules for the items, the step of generating usage rules including allowing operator selection of one or more vehicle operating variables on which to base a given usage rule;

providing service windows around the estimated service lives for items;

scheduling withdrawal of the vehicle from operation for service of a group of items with overlapping service windows including the items reaching exhaustion of their service lives; and modifying the usage rules to assess configuration and vocation of the vehicle.

6. The method according to claim 5, comprising the step of:

operating the estimating and scheduling steps in a simulation mode using historical data.

\* \* \* \* \*